(12) United States Patent
Keller et al.

(10) Patent No.: US 7,935,200 B1
(45) Date of Patent: *May 3, 2011

(54) PROCESS DEVELOPMENT PROTOCOL AND VACUUM BAG PROCESS FOR CARBON-EPOXY PREPREG PRODUCTION

(75) Inventors: Russell L. Keller, Maple Valley, WA (US); John F. Spalding, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/797,901

(22) Filed: Jun. 10, 2010

Related U.S. Application Data (63) Continuation-in-part of application No. 11/764,078, filed on Jun. 15, 2007, now Pat. No. 7,857,925.

(51) Int. Cl.
*B32B 41/00* (2006.01)

(52) U.S. Cl. ............. 156/64; 156/94; 156/98; 264/36.1; 264/36.22

(58) Field of Classification Search .............. 156/64, 156/94, 98; 29/402.09, 402.11; 264/36.1, 264/36.22
See application file for complete search history.

(56) References Cited

U.S. PATENT DOCUMENTS

| | | | |
|---|---|---|---|
| 5,236,646 A | 8/1993 | Cochran et al. | |
| 6,017,484 A | 1/2000 | Hale | |
| 6,761,783 B2 * | 7/2004 | Keller et al. | 156/94 |
| 7,186,367 B2 | 3/2007 | Hou et al. | |
| 7,413,694 B2 | 8/2008 | Waldrop, III et al. | |
| 2008/0048369 A1 | 2/2008 | Kulesha | |
| 2008/0308210 A1 * | 12/2008 | Keller et al. | 156/64 |

* cited by examiner

*Primary Examiner* — George R Koch, III
(74) *Attorney, Agent, or Firm* — Felix L. Fischer

(57) ABSTRACT

A protocol for determining process parameters for debulking composite laminates is established using a standardized double vacuum debulk (DVD) process. This allows for the development of a rapid fabrication process for thick laminates of toughened carbon/epoxy composite materials. The protocol provides for obtaining cure and current consolidation information of a composite material system as a preliminary baseline. A test matrix is prepared for varying time/temp profiles to pursue better results or find process limits and the testing defined by the matrix is run with variations of time/temp DVD profiles to confirm data values. Results for the process variations in the test matrix are then assessed. An optimum consolidation is determined and process points are defined at which quality drops off. The protocol results are then applied to part preparation for the material tested.

18 Claims, 8 Drawing Sheets

PROCESS DEVELOPMENT PROTOCOL AND VACUUM BAG PROCESS FOR CARBON-EPOXY PREPREG PRODUCTION

REFERENCE TO RELATED APPLICATIONS

This application is a continuation in part of application Ser. No. 11/764,078 filed on Jun. 15, 2007 now U.S. Pat. No. 7,857,925 by Russell L. Keller et al. entitled PROCESS DEVELOPMENT PROTOCOL AND VACUUM BAG PROCESS FOR CARBON-EPOXY PREPREG PATCH and having a common assignee with the present application, which is incorporated herein by reference. This application is copending with application Ser. No. 12/641,897 filed on Dec. 18, 2009 entitled Double Vacuum Cure Processing of Composite Parts having a common assignee with the present application, which is incorporated herein by reference.

BACKGROUND

1. Field

The embodiments herein relate generally to composite structures and more particularly to a protocol for development of process parameters for double vacuum debulk processing of composite prepreg for original parts manufacturing and specific application to a carbon-epoxy pre-impregnated laminate (pre-preg) system for non-autoclave processing.

2. Related Art

Double vacuum bag processing, aka double vacuum debulk (DVD) processing, may be employed to cure composite parts such as prepreg laminates. DVD processing provides flexibility in parts processing and is not limited by the size of the part. The DVD process is also less capital equipment intensive than autoclave processing, and may provide tighter dimensional control and higher mechanical performance in the cured part compared to autoclave processing or single vacuum bag (SVB) processing.

Manufacturing processes and procedures for prepreg tape materials, specifically toughened carbon/epoxy prepreg, have vacuum bag process limitations that cause excessively long processing times. A standard vacuum bag and curing processes used in the prior art results in a patch or laminate that may have excessive porosity levels. Typical acceptable porosity levels are ≦2% for original manufacturing.

Additionally, building the laminate thickness in stages with adhesive layers in between is very time consuming and can have undesirable affects as having multiple layers of adhesive imbedded into the laminated part may result in excessive porosity in the adhesive layers. This result may be problematic for thick laminates as the required strengths may not be able to be obtained using the current vacuum bag processes. Unless the part can be processed in an autoclave, a thick toughened carbon/epoxy composite may not be possible with prior art techniques.

It is therefore desirable to provide a protocol for establishing process times and parameters for application to a standard DVB debulk and curing approach. It is further desirable to employ the developed protocol for specific process parameter definition for composite laminate creation in toughened carbon/epoxy prepreg materials.

SUMMARY

The embodiments disclosed herein provide a protocol for determining process parameters for composite processing using DVD. The protocol provides for obtaining cure and current consolidation information of a composite material system as a preliminary baseline. A test matrix is prepared for varying time/temp profiles to pursue better results or find process limits and the testing defined by the matrix is run with variations of time/temp DVD profiles to confirm data values. Results for the process variations in the test matrix are then assessed. An optimum consolidation is determined and process points are defined at which quality drops off. The protocol results are then applied to part preparation for the material tested.

Initial trials by fabrication of test panels simulating rework patches are then conducted with multiple variations of time/temp DVD profiles based on viscosity profile to confirm data values. Trial panels of varying thicknesses are fabricated. The panels are then evaluated.

For certain embodiments, a determination is made if a rheology study is required and if so, the rheology study is conducted to determine resin viscosity profile upon heat up to cure temperature.

For exemplary evaluation of panels a Non-destructive Inspection (NDI) of at least one panel is conducted using 5 MHz through-transmission ultrasonics, assessing panel bleed during both debulk and cure, assessing general quality appearance, and determining panel average thickness to confirm part quality. A test matrix for varying time/temperature profiles is then prepared to pursue better results or find process limits and the processes of the initial trials are repeated on the panels. A determination of an optimum consolidation and defining process points at which quality drops off is made and the protocol results are applied to processing for the material tested.

These and other features and advantages of the present embodiments will be better understood by reference to the following detailed description when considered in connection with the accompanying drawings.

DETAILED DESCRIPTION

Figure 1:
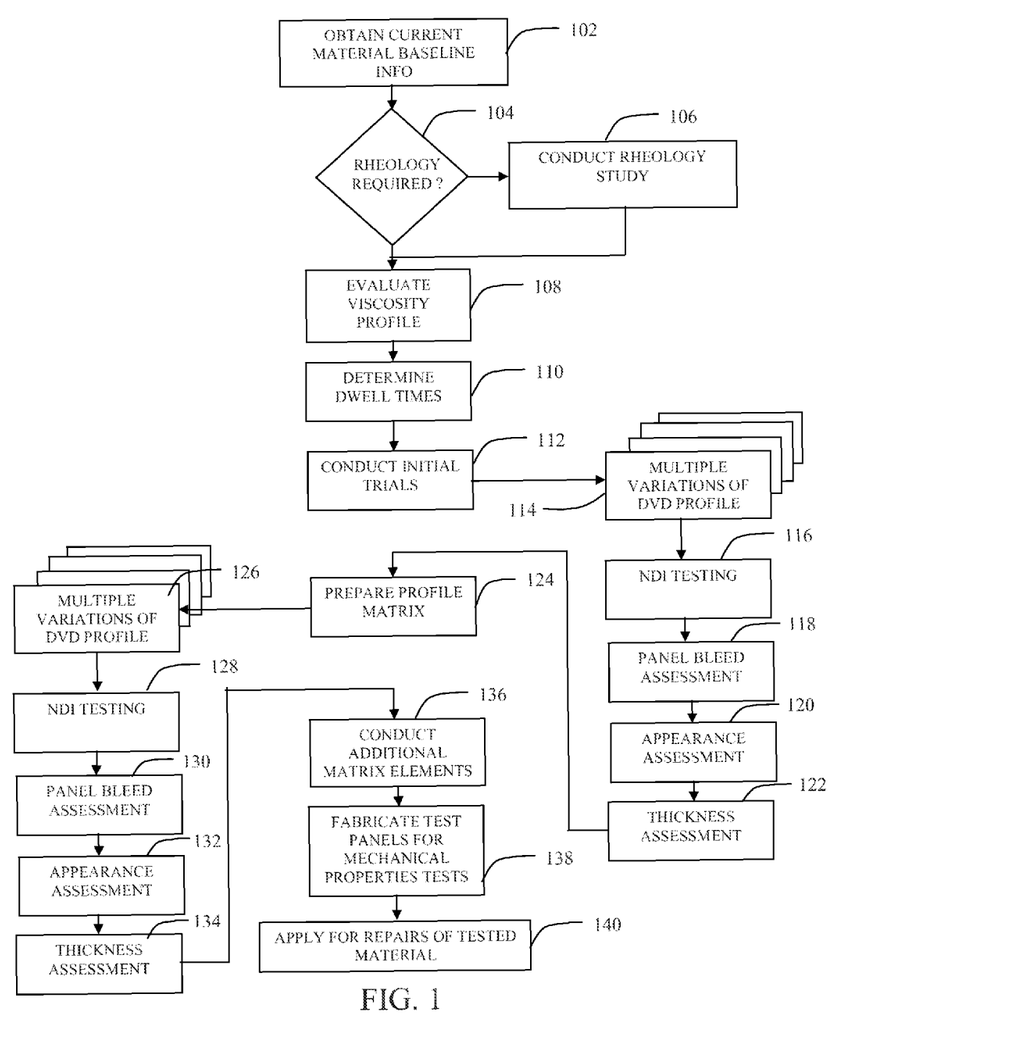
FIG. 1 is a flowchart of the process parameter definition protocol.

Establishing a protocol for determining process parameters for composite part fabrication using a standardized approach of DVD creates consistent and predictable laminate characteristics. The developed process is then applied to fabrication of multilayer structures for specialty fabrication of new structural elements. As shown in FIG. 1, the exemplary embodiment of the protocol provide for obtaining cure and current consolidation information of material system 102 as a preliminary baseline. Based on the information available, a determination is made if a rheology study is required 104. If so, the rheology study is conducted to determine resin viscosity profile upon heat up to cure temperature 106.

The viscosity profile is evaluated for initial trials in fabricating a panel using the DVD vacuum bag process including determining temperature at which resin reaches minimum viscosity 108 and assessing dwell times depending upon time at minimum viscosity through gel time 110.

With the information on the viscosity profile in hand, initial trials are conducted 112. In these trials, typical size of the specimen is 12" by 12" and typical thickness depends on current demonstrated curing ability, however, 16-plies as employed in exemplary embodiments of the protocol provides a good starting point. The actual implemented process will be described in greater detail subsequently however, for the protocol trials a 30 min single bag consolidation process is employed prior to ramp up to cure temperature using a typical bagging process. Multiple variations 114 of time/temp DVD profiles based on viscosity profile are run in the trials to confirm data values.

The trial results are evaluated with an NDI panel using 5 MHz through transmission ultrasonics 116. Panel bleed is assessed during both debulk and cure 118 and the panel is assessed for general quality appearance 120. Panel average thickness is measured 122 to confirm patch quality.

Based on the results of the initial trials, a test plan for varying time/temp profiles defined in a test matrix to pursue better results or find process limits is prepared 124. The test matrix may include a complete set of panels to fabricate/evaluate based on the selected profiles. The process variations 126 of time/temp DVD profiles are run on the set of test panels corresponding to the test matrix to confirm data values. The panels resulting from the test matrix are evaluated with an NDI panel using 5 MHz through transmission ultrasonics 128 and panel bleed is assessed during both debulk and cure 130. The panels are assessed for general quality appearance 132. Panel average thickness is measured to confirm patch quality 134.

Other factors may need modifications, such as bagging material arrangements, vacuum levels, contouring requirements, etc. which are addressed with additional matrix elements 136 with additional testing, as required, to confirm these elements. Different panel sizes and thicknesses are also fabricated and evaluated to determine process robustness and modification requirements due to those changes.

The protocol result is a determination of optimum consolidation and defines process points at which quality drops off. Based on successful and best process, panels can be fabricated for mechanical property tests 138 to determine property improvements due to increased consolidation. The protocol results are then applied to patch fabrication for the material tested 140.

Figure 2:
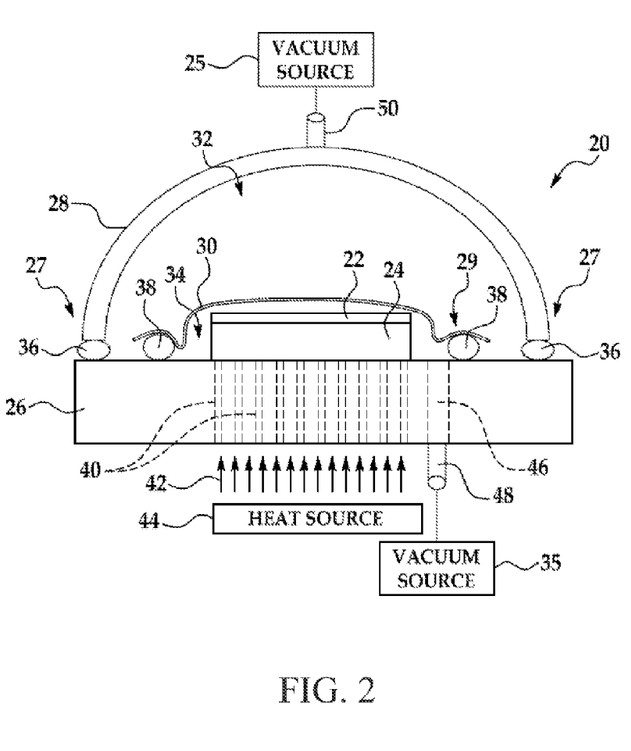
FIG. 2 is an illustration of a sectional view of an apparatus for double vacuum curing of composite laminates according to one embodiment.

An exemplary structure for a double vacuum chamber apparatus which is employed to implement the developed protocol is shown in FIG. 2. A double vacuum chamber apparatus 20 is used to perform out-of-autoclave curing of a composite part 22. As used herein, "part" and "composite part" are used in their broadest sense and include but are not limited to various forms of structures, such as, without limitation, beams, supports, panels, structural and non-structural members, elements and subassemblies, to name only a few. The part 22 may comprise a multi-ply prepreg laminate which is placed on or against a tool 24 supported on a metallic tool base 26. A flexible, inner vacuum bag 30 covers the part 22 and is sealed around its periphery 29 to the tool base 26, thereby forming an inner vacuum chamber 34 over the part 22. The bag 30 may comprise, for example and without limitation, a conventional one-time-use nylon bag and the seal 38 may be a conventional, non-reusable sealant. Alternatively, the bag 30 may be a reusable type made of, for example and without limitation, an elastomeric material, and the seal 38 may comprise a reusable elastomeric seal. Although not shown in FIG. 2 for purposes of clarity, additional layers of material as will be described in greater detail subsequently may be placed on the part 22, beneath the flexible bag 30, including but not limited to separator films, breathers and caul plates.

A substantially rigid outer shroud 28 covers the inner vacuum bag and is sealed around its outer periphery 27 to the tool base 26 by a seal 36, thereby forming a first, outer vacuum chamber 32 over the composite part 22. In one embodiment, the seal 36 may comprise a reusable elastomeric seal that is permanently affixed to the periphery 27 of the outer shroud 28. The outer shroud 28 may comprise any suitable material such as a metal or a composite that possesses sufficient rigidity to allow the shroud 28 to be substantially self-supporting and retain its shape. The shroud 28 may possess any of various shapes both in footprint and cross section that are suitable for covering the particular part 22 to be cured. The outer shroud 28 includes a vacuum port 50 connected with a suitable vacuum source 25 which is operable to draw a desired vacuum in the outer vacuum chamber 32.

The tool base 26 may include a passageway 46 therein which communicates with the inner vacuum chamber 34. The passageway 46 is coupled through a vacuum port 38 to a vacuum source 35 which is used to draw a desired level of vacuum within the inner vacuum chamber 34 during cure processing. The tool base 26 may also include one or more vent openings 40 therein to allow heat indicated by the arrows 42 from a heat source 44 to be vented directly against the tool 24. Alternatively, cure processing using the apparatus 20 may be performed within an oven (not shown) which is used to heat the composite part 22 to the required cure temperature.

Figure 3:
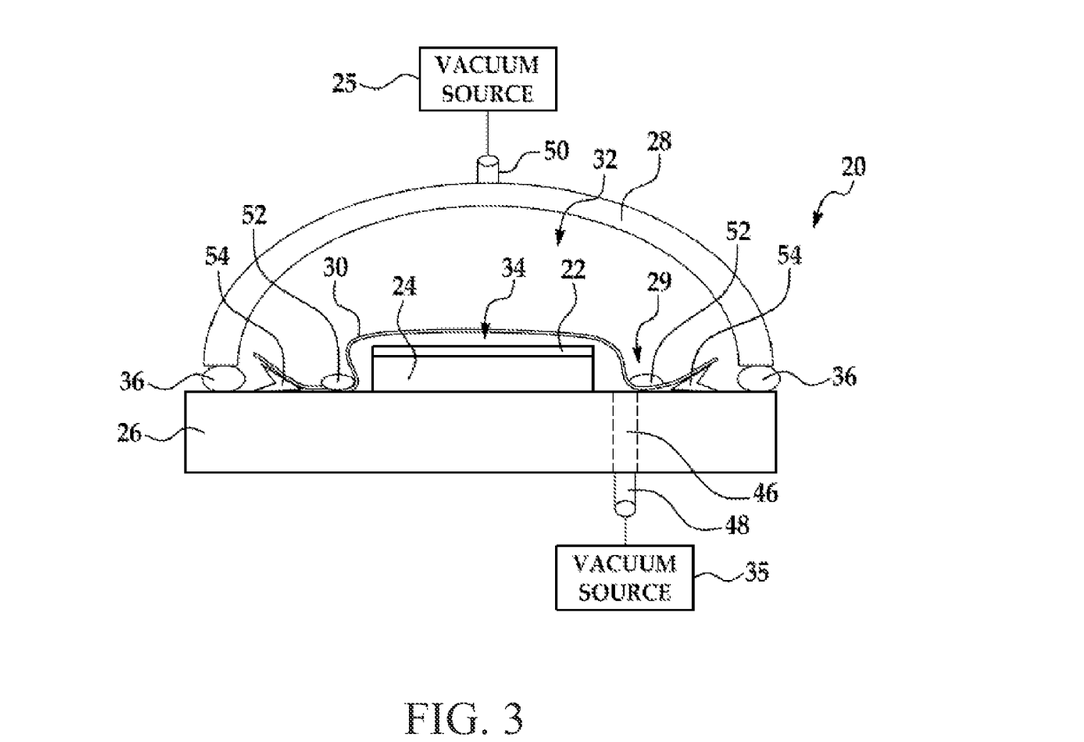
FIG. 3 is an illustration of a sectional view of an alternate form of the apparatus in which magnetic means are employed to attach the flexible inner bag to a tool.

FIG. 3 illustrates an alternate example of the apparatus 20 in which a reusable type elastomeric inner vacuum bag 30 covers the composite part 20. The bag 30 includes a magnetic strip 52 integrated into and surrounding the periphery of the bag 30 for holding the bag 30 against the metallic tool base 26. The bag 30 further includes a reusable vacuum seal 54 permanently bonded to the bag 30 for creating a vacuum tight seal outside of the magnetic strip 52 and surrounding the part 22. Integration of the bag 30, the magnetic strip 52 and the reusable seal 54 into a single assembly allow the bag 30 to be quickly deployed over the part 22 and sealed to the tool base 26.

Figure 4:
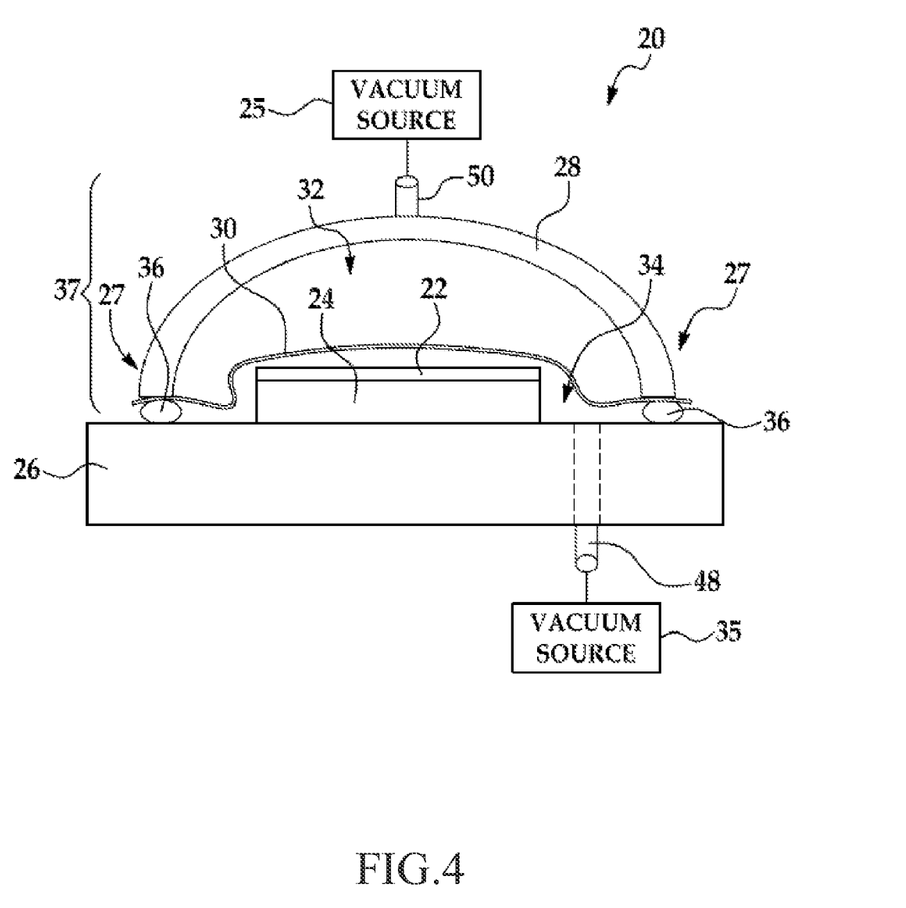
FIG. 4 is an illustration of a sectional view of another embodiment of the apparatus in which the flexible inner bag and outer rigid shroud are integrated into a single assembly.

Yet another example is shown in FIG. 4 in which the inner, flexible bag 30 is permanently attached to the periphery 27 of the outer shroud 28 so that the outer shroud 28 and inner bag 30 form a single double vacuum chamber assembly 37 that may be easily and quickly placed on and sealed to the tool base 26, covering the part 22. The integration of the outer shroud 28, inner bag 30 and seal 36 into a single assembly 37 permits checking the outer shroud 28 and inner bag 30 for leaks before they are installed over the part 22, thus reducing processing time. In this example, a reusable seal 36 is attached to the periphery 27 of the shroud 28, with the inner bag 30 sandwiched therebetween so that the seal 36 functions to seal both the outer and inner vacuum chambers 32, 34 respectively on the tool base 26.

It should be noted here that while the various embodiments are described in connection with producing original composite parts as part of a manufacturing process, various components of the apparatus including the double vacuum chamber assembly 37, as well as the disclosed method may be employed to rework parts or structures. For example the embodiments may be employed to cure a composite patch (not shown) and remove volatiles therefrom that is used to rework a portion of a structure such as an aircraft skin (not shown), either to improve the structure or to restore the structure to original specifications: In a rework application of the embodiments, the double vacuum chamber assembly 37 may be placed on and sealed to a sufficiently rigid structure, rather than to a tool base 26 as shown in the drawings.

Figure 5A:
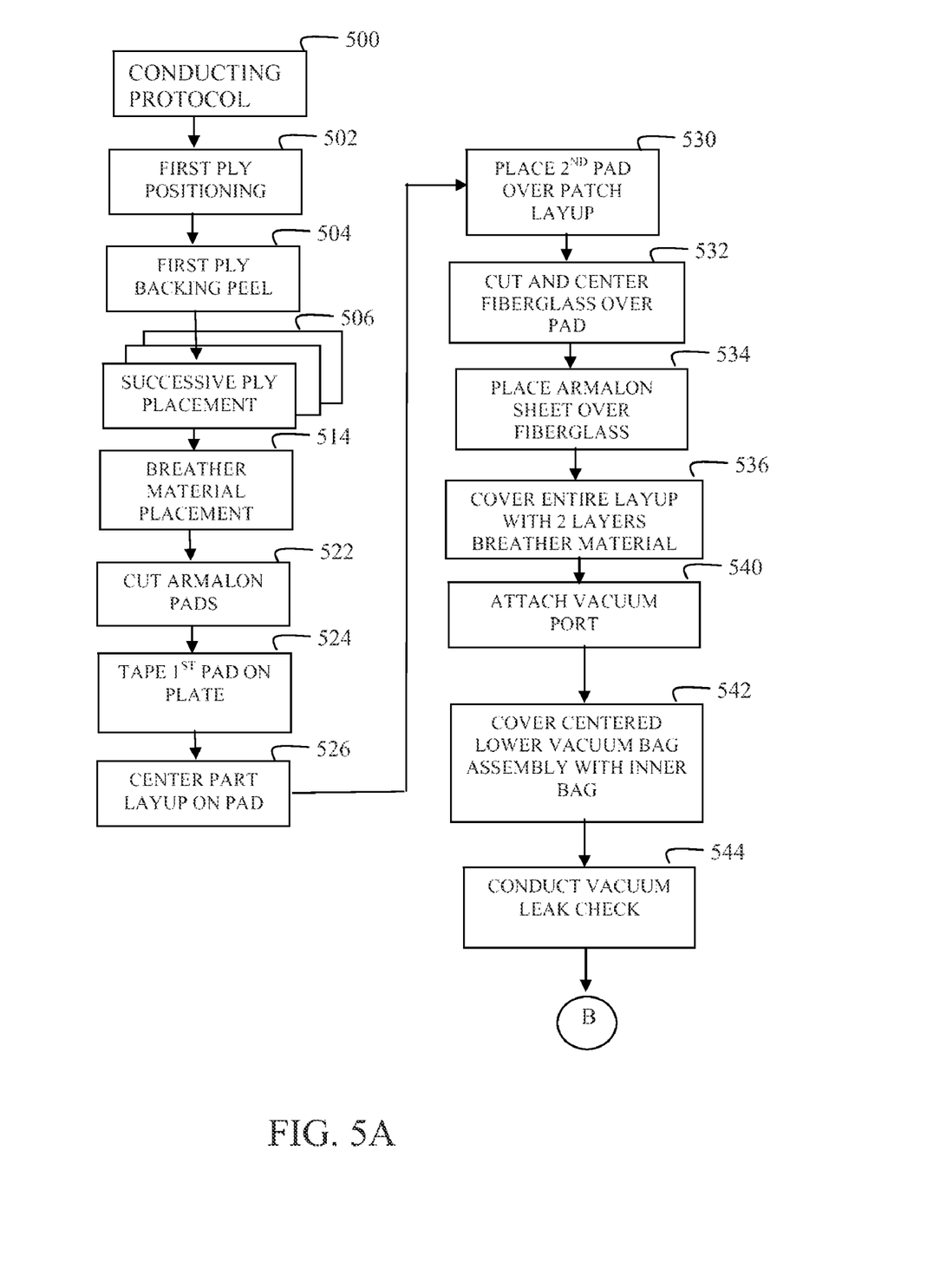
FIGS. 5A-5B provide a flow chart of preparation of a toughened carbon/epoxy prepreg patch using the developed process parameters defined in FIG. 1.
Figure 5B:
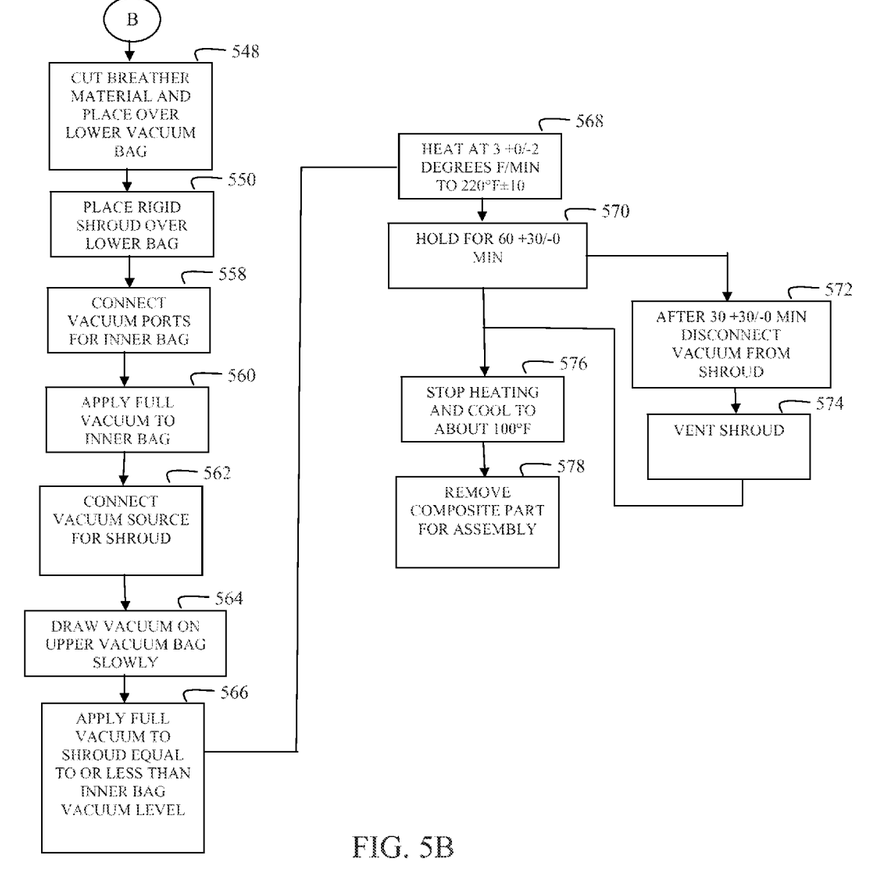

FIGS. 5A-5B describe the process steps (elements 500 et seq) with respect to FIG. 2 as exemplary of the double vacuum chamber apparatus for implementing part fabrication using the protocol described in FIG. 1. After conducting the protocol for process determination in step 500, the first ply is positioned in step 502. The ply's backing material is removed in step 504. Subsequent plies are located and oriented correctly with regard to fiber direction and location tolerance with each successive ply lightly swept or rolled into place in step 506. Only a force sufficient to allow removal of the ply backing paper and prevent ply movement is applied. This process is repeated for each additional ply until all have been assembled as a part 22.

Figure 6:
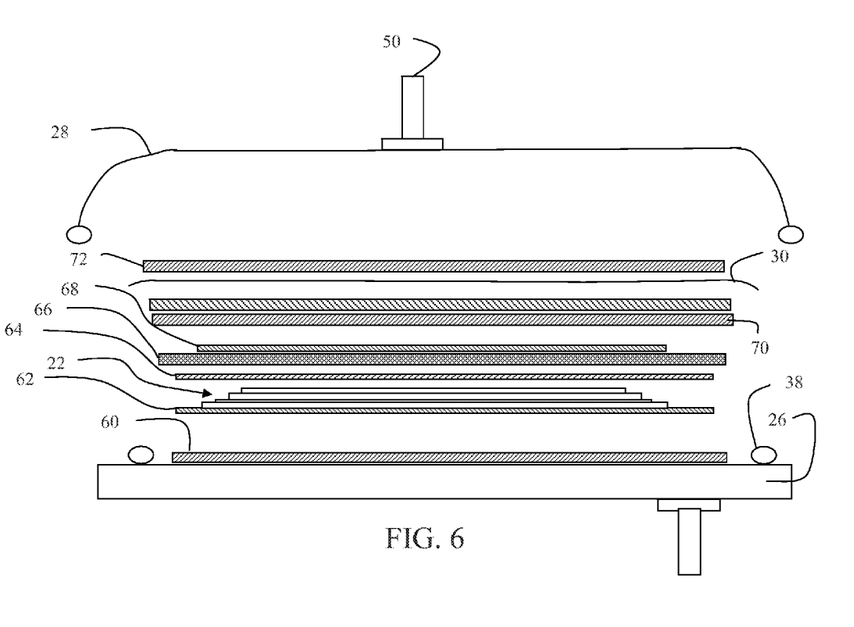
FIG. 6 a detailed side view of the layers in the two vacuum chambers employed for preparation of the toughened carbon/epoxy prepreg patch using the method of FIGS. 5A and 5B.

Referring additionally to FIG. 6, an inner vacuum assembly is prepared by placing a layer of breather material 60 on tool base 26 in step 514 large enough for the entire double vacuum debulk assembly. Two same-sized pieces of antiadherent glass fabric coated with polytetrafluoroethylene (PTFE) such as 1-mil porous Armalon® are cut one inch larger than the patch material in all directions in step 522. One piece of the porous PTFE 62 is centered on the breather and taped in place in step 524. The laminated part 20 to be debulked is centered onto the porous PFTE in step 526. The second piece of porous PTFE 64 is centered over the part in step 530.

One ply of 120-style or 220-style fiberglass cloth 66 is cut large enough to extend past the part and contact upper breathers and centered over the part in step 532. A piece of 3-mil nonporous PTFE or solid Fluorinated Ethylene Propylene (FEP) 68 is placed over the fiberglass cloth in step 534. The entire layup is then covered in step 536 with two layers of breather material 70. The inner vacuum bag sealing elements 38 (or 52 and 54 as described with respect to FIG. 3) are placed for the inner bag in step 540.

The entire inner vacuum bag assembly is covered with the inner bag 30 and sealed in step 542. The vacuum source 35 is connected to port 48, vacuum applied and a leak check performed in step 544. Any leaks are sealed and vacuum is removed.

In the exemplary layup shown in FIG. 6 one layer of breather material 424 may be cut to fit just inside the seal 36 and placed on top of inner bag in step 546. This layer acts as additional insulation for the material being debulked. The rigid outer shroud 28 is then installed in step 548.

To commence the debulking process, the vacuum source is reconnected to the vacuum port for the inner bag and full vacuum (minimum of 26" Hg at STP conditions) is applied in step 560. A vacuum source 25 is connected to the rigid outer shroud in step 562. Vacuum is slowly drawn in step 564, ensuring that the seal 36 is complete. Full vacuum is then applied to the shroud vacuum port and adjusted as necessary to ensure the vacuum is equal to or slightly less (tolerance of +0/−1" Hg) than the inner bag vacuum level in step 566. No more than 1-inch absolute pressure should be on the layers of laminating material in the part 20 in order to allow the debulk process to work.

Based on tolerances defined in the process determination protocol previously described which established a processing window applicable to flat laminates of 48 plies or less, and no larger than 16 inches in length, heat is applied to the patch material at a rate of 3 +0/−2 degrees F. per minute to the debulk temperature of 220±10 degrees F. in step 268. The debulk temperature is held for 60 +30/−0 minutes in step 570. After 30 +30/−0 minutes of the 60 minute hold at the debulk temperature, the vacuum hose is disconnected from the upper vacuum assembly in step 572, and the upper vacuum bag is then vented in step 574. The shroud may be removed when the vacuum is vented as long as the inner vacuum bag is not disturbed. After the hold at the debulk temperature is complete, the heating is stopped and the part is allowed to cool to approximately 100 degrees F. in step 576. No cool down rate control is required.

For the layup example disclosed, all of the plies for the laminated part can be stacked and consolidated at one time saving a substantial amount of process time; no ply-by-ply debulking process is required to consolidate the plies at one time and the consolidated part is transferred for further manufacturing processes. This provides capability for very thick laminates not currently available as well as saving a substantial amount of processing time. Current data has shown the process disclosed is applicable for up to 96 plies.

Figure 7:
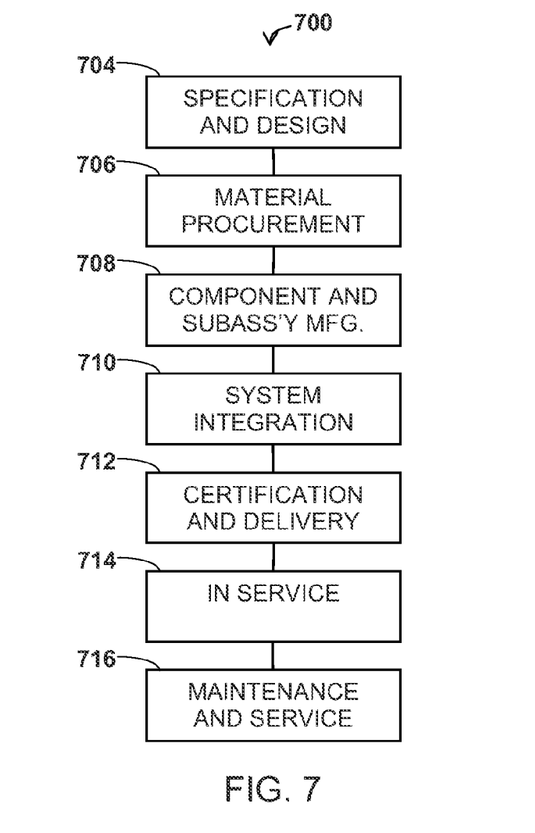
FIG. 7 is a flow diagram of aircraft production and service methodology.
Figure 8:
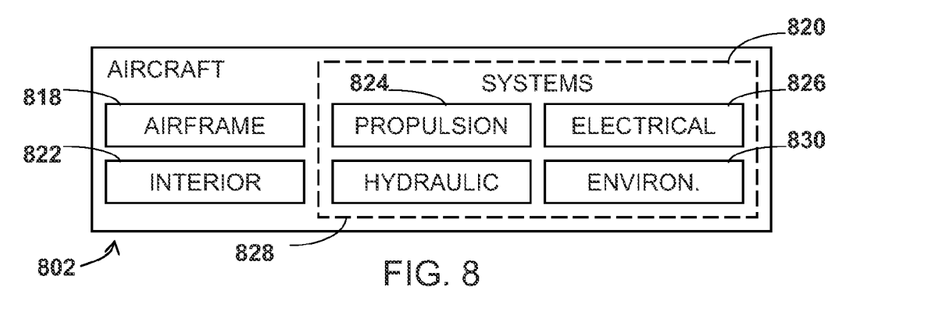
FIG. 8 is a block diagram of an aircraft.

Referring FIGS. 7 and 8, embodiments of the disclosure may be described in the context of an aircraft manufacturing and service method 700 as shown in FIG. 7 and an aircraft 802 as shown in FIG. 8. During pre-production, exemplary method 700 may include specification and design 704 of the aircraft 802 and material procurement 706. During production, component and subassembly manufacturing 708 and system integration 710 of the aircraft 802 takes place. Thereafter, the aircraft 802 may go through certification and delivery 712 in order to be placed in service 714. While in service by a customer, the aircraft 802 is scheduled for routine maintenance and service 716 (which may include modification, reconfiguration, refurbishment, and so on).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 802 produced by exemplary method 700 may include an airframe 818 with a plurality of systems 820 and an interior 922. Examples of high-level systems 820 include one or more of a propulsion system 824, an electrical system 826, a hydraulic system 826, and an environmental system 830.

Apparatus and methods embodied herein may be employed during any one or more of the stages of the production and service method 700. For example, components or subassemblies corresponding to production process 708 may be fabricated or manufactured in a manner similar to components or subassemblies produced while the aircraft 802 is in production. Also, one or more apparatus embodiments, method embodiments, or a combination thereof may be utilized during the production stages 708 and 710, for example, by substantially expediting assembly of or reducing the cost of an aircraft 802. Similarly, one or more of apparatus embodiments, method embodiments, or a combination thereof may be utilized while the aircraft 802 is in service, for example and without limitation, to maintenance and service 716.

Having now described exemplary embodiments in detail as required by the patent statutes, those skilled in the art will recognize modifications and substitutions to the specific embodiments disclosed herein. Such modifications are within the scope and intent of the present invention as defined in the following claims.

What is claimed is:

1. A protocol for determining process parameters for laminated part preparation using double vacuum debulk (DVD) comprising the steps of
   obtaining cure and current consolidation information of a composite material system as a preliminary baseline;
   preparing a matrix for varying time/temp DVD profiles to pursue better results or find process limits;
   running the matrix variations of time/temp DVD profiles to confirm data values;
   assessing results for the matrix variations;
   determining an optimum consolidation and defining process points at which quality drops off; and,
   applying protocol results to laminate preparation for the material tested.

2. The protocol defined in claim 1 further comprising
   conducting initial trials on a plurality of panels with multiple variations of time/temp DVD profiles based on viscosity profile to confirm data values; and
   evaluating trial results on the initial trial panels.

3. The protocol defined in claim 2 further comprising
   determining if a rheology study is required prior to initial trials;
   if so, determining resin viscosity profile upon heat up to cure temperature; and
   evaluating the viscosity profile for initial trials.

4. The protocol defined in claim 2 wherein the step of evaluating trial results on the initial trial panels comprises:
   evaluating at least one panel with a non-destructive inspection using 5 MHz through transmission ultrasonics;
   assessing panel bleed during both debulk and cure;
   assessing general quality appearance; and
   measuring panel average thickness to confirm part quality.

5. The protocol defined in claim 1 wherein the step of assessing the results of the matrix variations comprises:
   assessing panel bleed for the matrix variations during both debulk and cure assessing matrix panels for general quality appearance;
   measuring matrix panel average thickness to confirm part quality;
   evaluating matrix panels with an NDI panel using 5 MHz through transmission ultrasonics.

6. The protocol defined in claim 3 after the step of evaluating the viscosity profile further comprising the steps of;
   fabricating a panel using the DVD vacuum bag process;
   determining temperature at which resin reaches minimum viscosity; and
   assessing dwell times depending upon time at minimum viscosity through gel time.

7. The protocol defined in claim 2 wherein for initial trials are conducted on panels of about 12" by 12" and typical thickness and 16-plies with a 30 min single bag consolidation process employed prior to ramp up to cure temperature using a typical bagging process.

8. The protocol defined in claim 1 wherein the matrix includes a complete set of panels to evaluate selected profiles.

9. The protocol defined in claim 1 wherein the matrix variations include bagging material arrangements, vacuum levels, panel size and thickness to determine process robustness and modification requirements.

10. The protocol as defined in claim 1 further comprising fabricating representative panels for mechanical property tests to determine property improvements due to increased consolidation.

11. A method for laminated part fabrication comprising:
    conducting a protocol for determining process parameters for composite material preparation using double vacuum debulk (DVD);
    placing a plurality of plies for lamination as a part;
    preparing an inner vacuum assembly including the part;
    placing inner seals and covering the inner vacuum assembly with an inner vacuum bag;
    placing a rigid shroud over the inner vacuum bag;
    connecting a vacuum source to a vacuum port for the inner vacuum bag;
    connecting a second vacuum source to a vacuum port for the rigid shroud;
    drawing vacuum on the inner vacuum bag;
    drawing vacuum on the rigid shroud to a level no greater than the vacuum on the inner vacuum bag; and
    performing heating and vacuum release as defined by the protocol.

12. The method for laminated part fabrication as defined in claim 11 wherein conducting the protocol comprises:
    Obtaining cure and current consolidation information of a composite material system as a preliminary baseline;
    preparing a matrix for varying time/temp DVD profiles to pursue better results or find process limits;
    running the matrix variations of time/temp DVD profiles to confirm data values;
    assessing results for the matrix variations;
    determining an optimum consolidation and defining process points at which quality drops off; and,
    applying protocol results to laminate preparation for the material tested.

13. The method for laminated part fabrication as defined in claim 12 wherein assessing the results of the matrix variations comprises:
    assessing panel bleed for the matrix variations during both debulk and cure assessing matrix panels for general quality appearance;
    measuring matrix panel average thickness to confirm part quality;
    evaluating matrix panels with an NDI panel using 5 MHz through transmission ultrasonics.

14. The method for laminated part fabrication as defined in claim 12 further comprising:
    conducting initial trials on a plurality of panels with multiple variations of time/temp DVD profiles based on viscosity profile to confirm data values; and
    evaluating trial results on the initial trial panels.

15. The method for laminated part fabrication as defined in claim 14 further comprising:
    determining if a rheology study is required;
    if so, conducting the theology to determine resin viscosity profile upon heat up to cure temperature; and
    evaluating the viscosity profile for initial trials.

16. The method for laminated part fabrication as defined in claim 15 wherein the step of evaluating trial results on the initial trial panels comprises:
    evaluating at least one panel with a non-destructive inspection using 5 MHz through transmission ultrasonics;
    assessing panel bleed during both debulk and cure;

assessing general quality appearance; and
measuring panel average thickness to confirm part quality.

17. The method for laminated part fabrication as defined in claim 11 wherein the step of preparing an inner vacuum assembly including the part comprises:
   placing a layer of breather material on a tool base;
   cutting two same-sized pieces of PIPE about one inch larger than the multilayer assembly in all directions;
   centering one piece over the part;
   centering the second piece of porous PTFE over the part;
   cutting one ply of fiberglass to extend past the part and contact upper breathers and centering over the part;
   placing a piece of nonporous PTFE about one inch larger than the part over the fiberglass cloth; and
   covering the entire layup with two layers of breather material.

18. A process for toughened carbon/epoxy composites comprising the steps of:
   determining process parameters for composite patch lamination using double vacuum debulk (DVD) comprising the steps of:
   obtaining cure and current consolidation information of a composite material system as a preliminary baseline;
   determining if a rheology study is required;
   if so, conducting the rheology to determine resin viscosity profile upon heat up to cure temperature;
   evaluating the viscosity profile for initial trials;
   conducting initial trials with multiple variations of time/temp DVD profiles based on viscosity profile to confirm data values;
   evaluating trial results with an NDI panel using 5 MHz through transmission ultrasonics;
   assessing panel bleed during both debulk and cure;
   assessing general quality appearance;
   measuring panel average to confirm patch quality;
   preparing a matrix for varying time/temp profiles to pursue better results or find process limits;
   running the matrix variations of time/temp DVD profiles to confirm data values;
   assessing panel bleed for matrix variations during both debulk and cure assessing matrix panels for general quality appearance;
   measuring matrix panel average thickness to confirm patch quality;
   evaluating matrix panels with an NDI panel using 5 MHz through transmission ultrasonics;
   determining an optimum consolidation and defining process points at which quality drops off;
   preparing a multilayer assembly of the toughed carbon/epoxy prepreg as a part for insertion in a structure;
   preparing a inner vacuum bag assembly by
   placing a layer of breather material on a tool base;
   cutting two same-sized pieces of PTFE about one inch larger than the multilayer assembly in all directions;
   centering one piece over the part;
   centering the second piece of porous PTFE over the part;
   cutting one ply of fiberglass to extend past the part and contact upper breathers and centering over the part;
   placing a piece of nonporous PTFE about one inch larger than the part over the fiberglass cloth;
   covering the entire layup with two layers of breather material;
   placing seals around the entire layup on the tool base and installing an inner vacuum bag over the two layers of breather material onto the seal, and
   providing a rigid shroud enclosing the inner vacuum bag assembly;
   connecting a vacuum source to the inner bag and applying full vacuum;
   applying full vacuum to the rigid shroud and adjusting as necessary to ensure the vacuum is equal to or slightly less than the lower bag vacuum level;
   applying heat to the multilayer assembly for the part at a rate and to the temperature determined in the protocol;
   holding the temperature for a period determined in the protocol;
   allowing the part to cool to approximately 100 degrees F.

* * * * *